United States Patent
Mochida

(10) Patent No.: US 10,470,608 B2
(45) Date of Patent: Nov. 12, 2019

(54) BEVERAGE SUPPLY DEVICE

(71) Applicant: FUJI ELECTRIC CO., LTD., Kawasaki-shi, Kanagawa (JP)

(72) Inventor: Yukihide Mochida, Yokkaichi (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/364,626

(22) Filed: Nov. 30, 2016

(65) Prior Publication Data
US 2017/0156544 A1   Jun. 8, 2017

(30) Foreign Application Priority Data

Dec. 8, 2015 (JP) .................. 2015-239645
Dec. 8, 2015 (JP) .................. 2015-239655

(51) Int. Cl.
| | |
|---|---|
| *A47J 31/60* | (2006.01) |
| *B08B 9/032* | (2006.01) |
| *B08B 9/027* | (2006.01) |
| *B67D 1/07* | (2006.01) |

(52) U.S. Cl.
CPC .............. *A47J 31/60* (2013.01); *B08B 9/027* (2013.01); *B08B 9/0325* (2013.01); *B67D 1/07* (2013.01)

(58) Field of Classification Search
CPC combination set(s) only.
See application file for complete search history.

(56) References Cited

U.S. PATENT DOCUMENTS

| | | | | |
|---|---|---|---|---|
| 2004/0118291 A1* | 6/2004 | Carhuff | .................. | A47J 31/401 99/275 |
| 2013/0104743 A1* | 5/2013 | Deo | ......................... | A47J 31/60 99/275 |
| 2015/0020691 A1* | 1/2015 | Midden | ................ | A47J 31/4485 99/323.3 |
| 2015/0238045 A1* | 8/2015 | Hansen | ................. | A47J 31/369 99/295 |

FOREIGN PATENT DOCUMENTS

| | | |
|---|---|---|
| JP | 2001-179194 A | 7/2001 |
| JP | 5242907 B2 | 7/2013 |

OTHER PUBLICATIONS

Corrosipedia definition of catholyte.*
Achinami Nobuo, Process and Equipment for cleaning liquid beverage/ food conveying path, JP 2001-179194 translation (Year: 2001).*

* cited by examiner

*Primary Examiner* — Jason Y Ko
*Assistant Examiner* — Cristi J Tate-Sims
(74) *Attorney, Agent, or Firm* — Manabu Kanesaka

(57) ABSTRACT

A beverage supply device applied to a beverage dispenser providing a beverage to a beverage container and has a beverage supply route for supplying a milk beverage to the beverage container, includes a washing unit to, in response to a washing instruction, mix an undiluted wash fluid with a wash hot water to generate a wash fluid, the undiluted wash fluid being supplied from an undiluted wash fluid accommodating unit configured to accommodate the undiluted wash fluid, the hot water being supplied from a hot water storage unit configured to stores the hot water which is for generating pressurized steam for forming the milk beverage, supply the wash fluid to the beverage supply route communicating with the washing unit, and supply the hot water (Continued)

supplied from the hot-water storage unit to the beverage supply route as a rinse hot water.

6 Claims, 15 Drawing Sheets

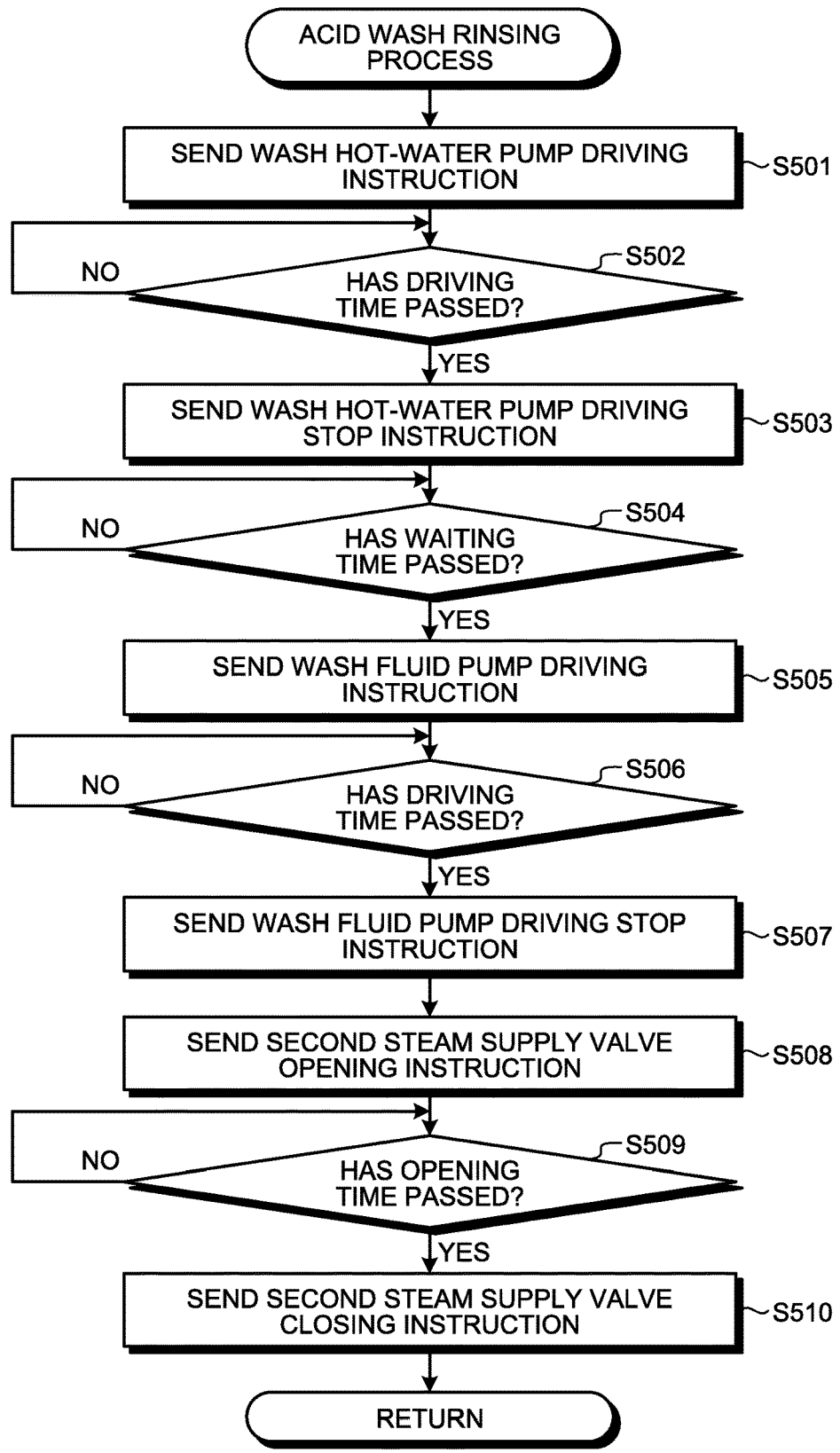

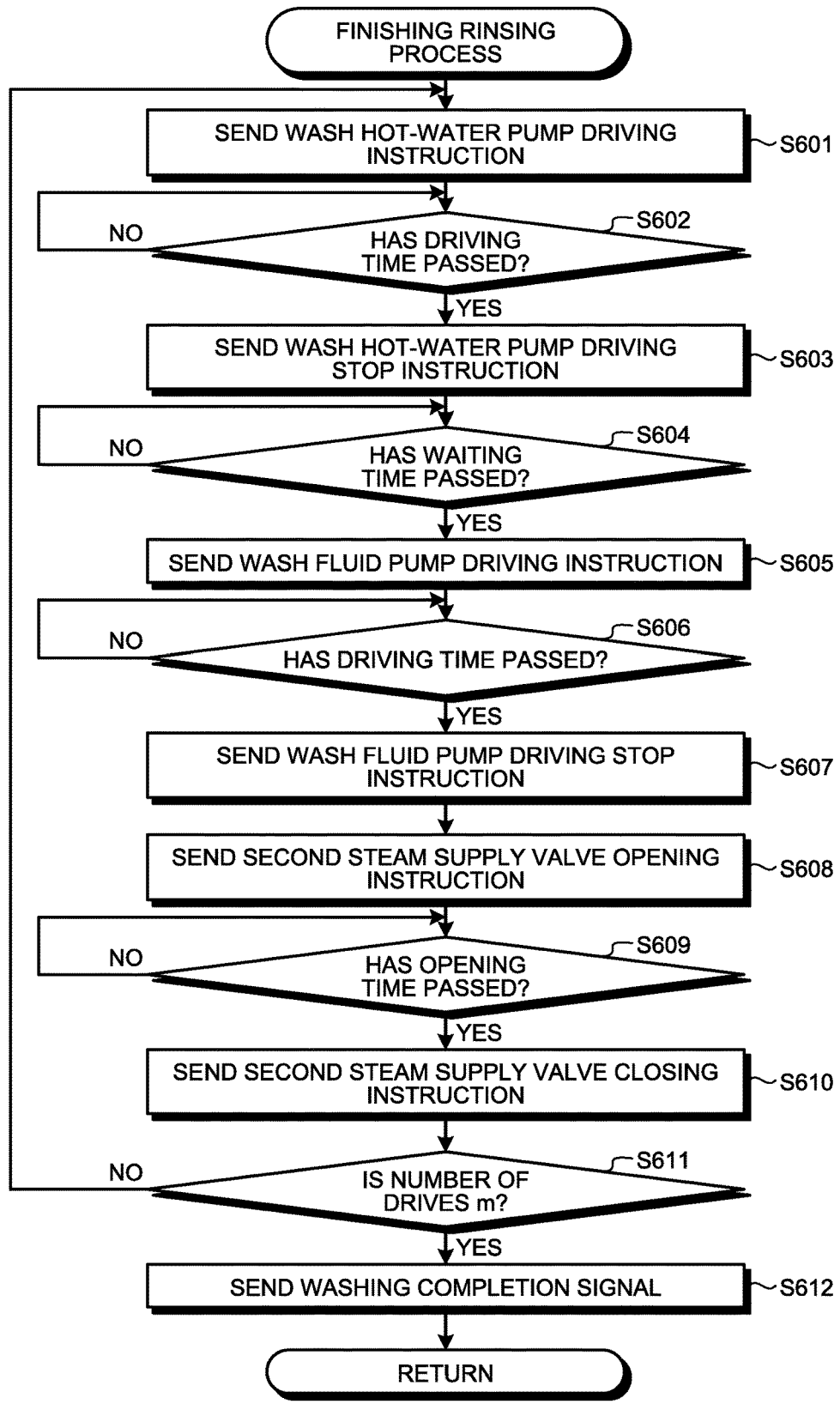

BEVERAGE SUPPLY DEVICE

CROSS-REFERENCE TO RELATED APPLICATION(S)

The present application claims priority to and incorporates by reference the entire contents of Japanese Patent Application No. 2015-239645 filed in Japan on Dec. 8, 2015 and Japanese Patent Application No. 2015-239655 filed in Japan on Dec. 8, 2015.

BACKGROUND

1. Field of the Disclosure

The present disclosure relates to a beverage supply device, and more particularly relates to a beverage supply device that is applied to a beverage dispenser that provides a beverage to a beverage container and has a beverage supply route for supplying a milk beverage to the beverage container.

2. Description of the Related Art

Among conventional beverage dispensers providing a coffee drink such as a cappuccino, as described in Japanese Patent No. 5242907, a beverage supply device is known that includes a beverage supply route for supplying a milk beverage such as milk.

Although not described in the above-described Japanese Patent No. 5242907, in case of washing the beverage supply route, a milk beverage storage unit storing a milk beverage such as milk is first disconnected from the beverage supply route, and then a wash fluid storage unit storing a wash fluid preliminarily diluted to a desired concentration is connected to the beverage supply route. By doing this, the wash fluid is supplied from the wash fluid storage unit to the beverage supply route. Upon completion of the supply of the wash fluid, the wash fluid storage unit is disconnected from the beverage supply route, and a rinse hot-water storage unit storing a rinse hot water is connected to the beverage supply route. By doing this, the rinse hot water is supplied from the rinse hot water storage unit to the beverage supply route so as to wash out the wash fluid from the beverage supply route. In this manner, the beverage supply route is washed.

Such a method of washing the beverage supply route, however, may require operations of disconnecting the milk beverage storage unit from the beverage supply route, connecting and disconnecting the wash fluid storage unit, and connecting and disconnecting the rinse hot-water storage unit to and from the beverage supply route, which renders the washing operations complicated. Especially, in a general process of washing the beverage supply route, an alkaline wash fluid is first passed through the route, and acid wash fluid is thereafter passed through the route. This process renders the washing operations remarkably complicated.

SUMMARY

It is an object of the present disclosure to at least partially solve the problems in the conventional technology.

A beverage supply device that is applied to a beverage dispenser providing a beverage to a beverage container and has a beverage supply route for supplying a milk beverage to the beverage container, the beverage supply device includes a washing unit to, in response to a washing instruction, mix an undiluted wash fluid with a wash hot water to generate a wash fluid, the undiluted wash fluid being supplied from an undiluted wash fluid accommodating unit configured to accommodate the undiluted wash fluid, the hot water being supplied from a hot water storage unit configured to stores the hot water which is for generating pressurized steam for forming the milk beverage, supply the wash fluid to the beverage supply route communicating with the washing unit, and supply the hot water supplied from the hot-water storage unit to the beverage supply route as a rinse hot water.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 14 is a flowchart illustrating an acid wash rinsing process illustrated in FIG. 7; and FIG. 15 is a flowchart illustrating a finishing rinsing process illustrated in FIG. 7.

DETAILED DESCRIPTION OF THE PREFERRED EMBODIMENTS

A preferable embodiment of a beverage supply device according to the present disclosure will be described in detail with reference to the accompanying drawings.

Figure 1:
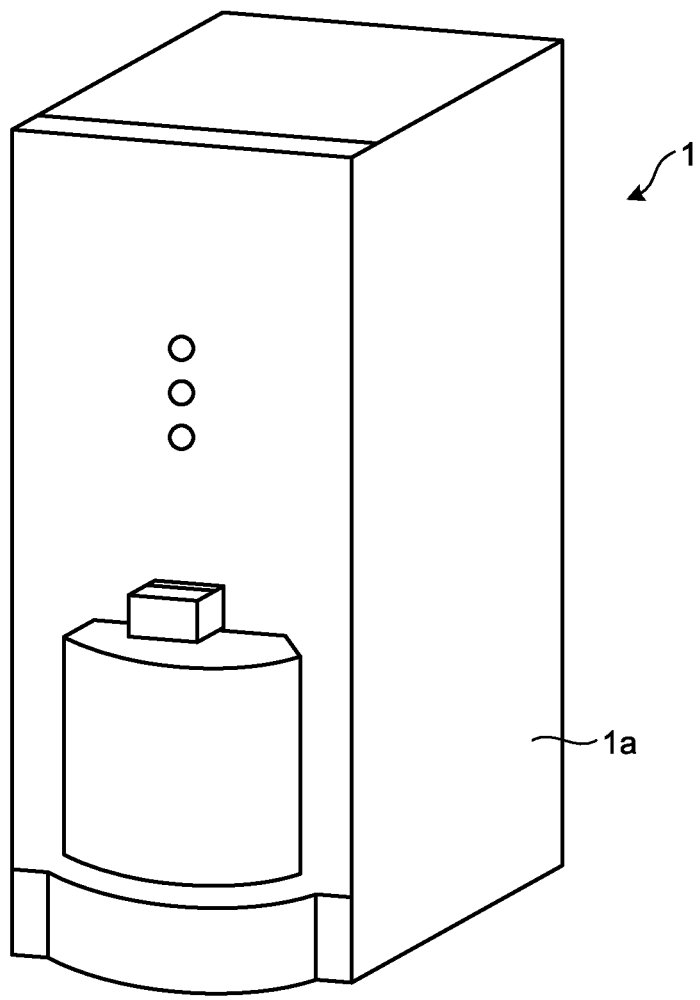
FIG. 1 is a perspective view of a beverage dispenser including a beverage supply device according to an embodiment of the present disclosure.
Figure 2:
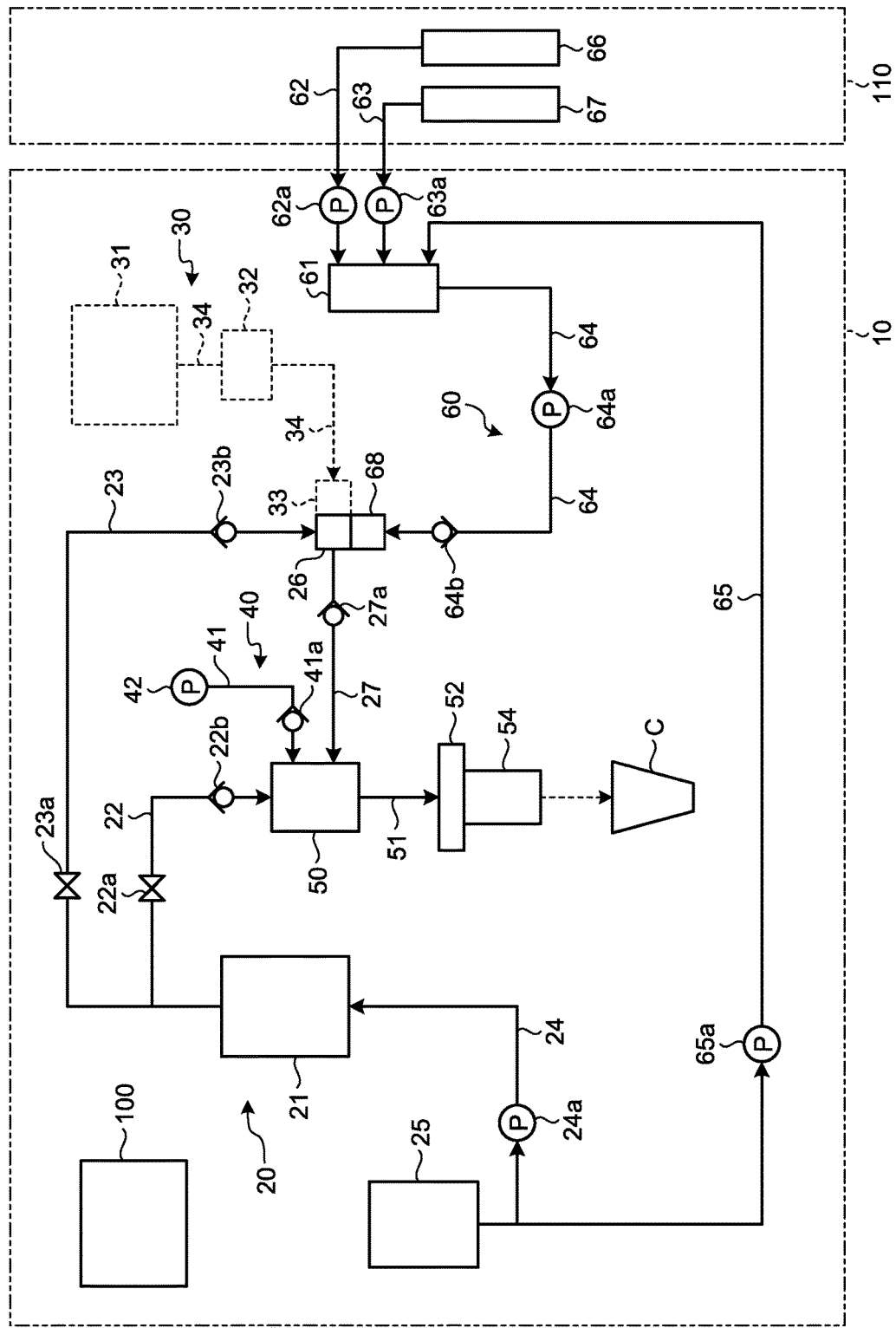
FIG. 2 is a schematic drawing illustrating a configuration of the beverage supply device according to an embodiment of the present disclosure.

FIG. 1 is a perspective view of a beverage dispenser including a beverage supply device according to an embodiment of the present disclosure. FIG. 2 is a schematic drawing illustrating a configuration of the beverage supply device according an embodiment of the present disclosure. A beverage dispenser 1 illustrated as an example is a machine for providing coffee drinks to a cup C (see FIG. 2) serving as a beverage container.

A beverage supply device 10 according to an embodiment is applied to the above-described beverage dispenser 1 and supplies milk as a milk beverage to the cup C with the milk foamed. The beverage supply device 10 includes a steam supply unit 20, an undiluted fluid supply unit 30, an air supply unit 40, a mixing unit 50, a foaming unit 52, a nozzle 54, and a washing unit 60.

The steam supply unit 20 includes a steam tank 21, a first steam supply pipe 22, and a second steam supply pipe 23. The steam tank 21 is connected to a hot-water tank 25 through a hot-water supply pipe 24. The hot-water tank 25 serves as a storage unit for storing a hot water and stores a hot water by heating water supplied from a water supply means (not illustrated). The hot-water supply pipe 24 has an end connected to the hot-water tank 25 and the other end connected to the steam tank 21 and connects the hot-water tank 25 with the steam tank 21. A hot-water supply pump 24a is disposed on the hot-water supply pipe 24. The hot-water supply pump 24a drives upon receipt of an instruction from a control unit 100 (see FIG. 2) to supply hot water from the hot-water tank 25 to the steam tank 21.

The control unit 100 provides (performs) overall control on the operations of units in the beverage supply device 10 according to a computer program and data stored in a memory (not illustrated).

The steam tank 21 heats the hot water supplied from the hot-water tank 25 through the hot-water supply pipe 24 and generates pressurized steam. In this process, the hot-water tank 25 stores a hot water for generating pressurized steam.

The first steam supply pipe 22 has an end connected to the steam tank 21 and the other end connected to the mixing unit 50 and connects the steam tank 21 with the mixing unit 50. A first steam supply valve 22a and a first steam check valve 22b are disposed on the first steam supply pipe 22. The first steam supply valve 22a opens and closes upon receipt of instructions from the control unit 100. In an open state, the first steam supply valve 22a allows the pressurized steam to travel through the first steam supply pipe 22. In the closed state, the first steam supply valve 22a restricts the travel of the pressurized steam through the first steam supply pipe 22. The first steam check valve 22b allows the fluid (pressurized steam) to travel from the steam tank 21 to the mixing unit 50 and restricts the travel of the fluid from the mixing unit to the steam tank 21.

The second steam supply pipe 23 has an end connected to the steam tank 21 and the other end connected to a first connection unit 26 connectable with the undiluted fluid supply unit 30 and the washing unit 60 and connects the steam tank 21 with the first connection unit 26. The first connection unit 26 is provided to an end of a fluid supply pipe 27 connected to the mixing unit 50. The fluid supply pipe 27 has a fluid check valve 27a. The fluid check valve 27a allows fluid to travel from the first connection unit 26 to the mixing unit 50 and restricts the travel of the fluid from the mixing unit 50 to the first connection unit 26.

A second steam supply valve 23a and a second steam check valve 23b are disposed on the second steam supply pipe 23. The second steam supply valve 23a opens and closes upon receipt of instructions from the control unit 100. In the open state, the second steam supply valve 23a allows the pressurized steam to travel through the second steam supply pipe 23. In the closed state, the second steam supply valve 23a restricts the travel of the pressurized steam through the second steam supply pipe 23. The second steam check valve 23b allows fluid (pressurized steam) to travel from the steam tank 21 to the first connection unit 26 and restricts the travel of the fluid from the first connection unit 26 to the steam tank 21.

The undiluted fluid supply unit 30 includes a bag-in-box (which may be simplified as a BIB) 31, a tube pump 32, and a second connection unit 33.

The BIB 31 is configured in such a manner that accommodates a bag container, in which undiluted fluid (which may be referred to as undiluted milk) of a milk beverage (foamed milk) to be supplied to the cup C is sealed, in a box container. The BIB 31 is disposed in a refrigerator of the beverage dispenser 1. The refrigerator is a heat-insulating room equipped inside a dispenser body 1a of the beverage dispenser 1.

The tube pump 32 is provided in a lower part of the BIB 31 in the refrigerator. The tube pump 32 drives upon receipt of an instruction from the control unit 100 to draw the undiluted milk from the BIB 31 in such a manner that presses a tube 34 connected to the BIB 31 with a plurality of rollers or the like. The second connection unit 33 is a connector provided to an end of the tube 34 connected to the BIB 31 and connectable with the first connection unit 26.

The air supply unit 40 includes an air supply pipe 41. The air supply pipe 41 has an end connected to an air pump 42 and the other end connected to the mixing unit 50 and connects the air pump 42 with the mixing unit 50. The air pump 42 drives upon receipt of an instruction from the control unit 100 to compress air, and sends out the compressed air through the air supply pipe 41.

An air check valve 41a is disposed on the air supply pipe 41. The air check valve 41a allows fluid (compressed air) to travel from the air pump 42 to the mixing unit 50 and restricts the travel of the fluid from the mixing unit 50 to the air pump 42.

The mixing unit 50 generates a slightly foamed milk beverage in such a manner that heats the undiluted milk by mixing pressurized steam supplied through the first steam supply pipe 22 with the undiluted milk supplied through the fluid supply pipe 27 and mixes the undiluted milk with compressed air supplied through the air supply pipe 41.

The foaming unit 52 is connected to the mixing unit 50 through a beverage sending pipe 51. The foaming unit 52 foams the milk beverage sent out from the mixing unit 50 through the beverage sending pipe 51.

The nozzle 54 is connected to the foaming unit 52 through a beverage induction path (not illustrated). The nozzle 54 supplies the milk beverage (foamed milk beverage) sent out from the foaming unit 52 through the beverage induction path to the cup C.

In this embodiment, the beverage supply route for supplying milk beverages is configured with the first connection unit 26, the fluid supply pipe 27, the mixing unit 50, the beverage sending pipe 51, the foaming unit 52, the beverage induction path, and the nozzle 54.

The washing unit 60 includes a mixing container 61, a first undiluted wash fluid supply pipe 62, a second undiluted wash fluid supply pipe 63, a wash fluid supply pipe 64, and a wash hot-water supply pipe 65.

Figure 3:
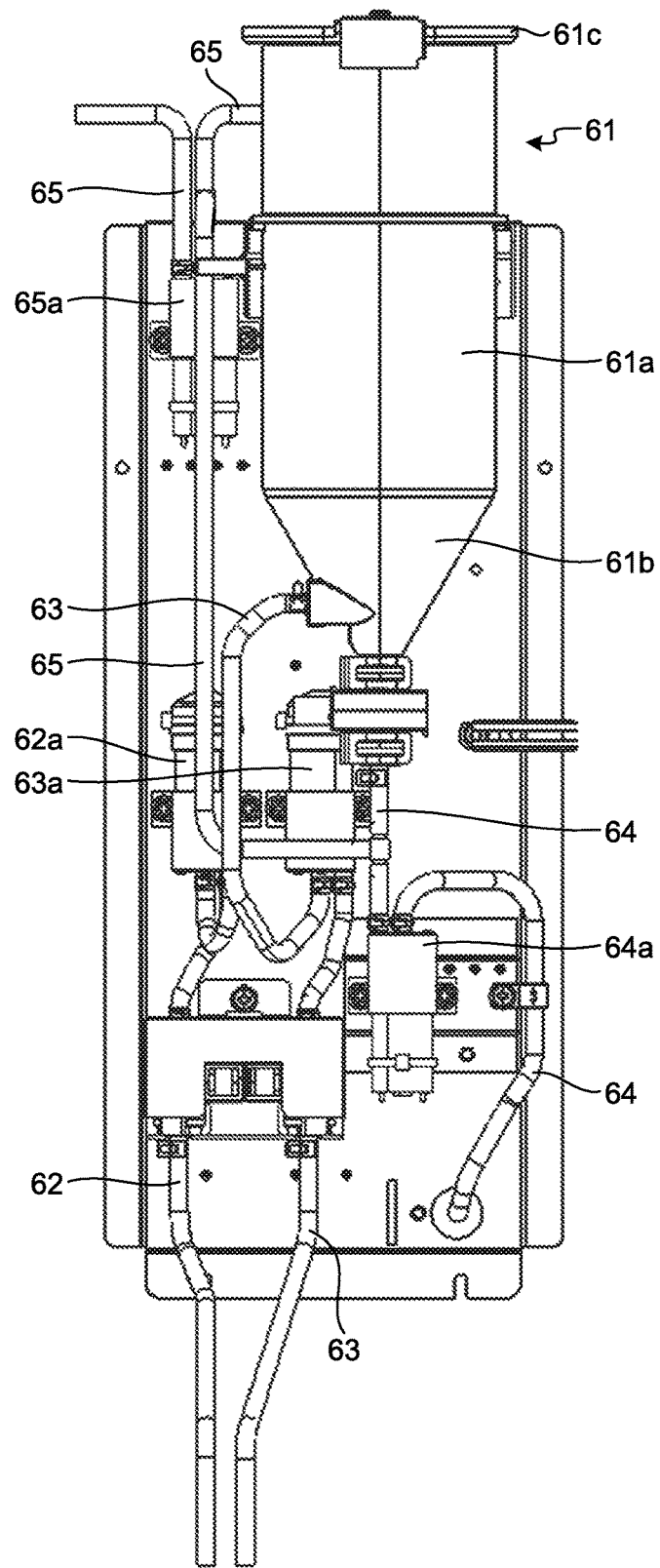
FIG. 3 is a side view of a mixing container illustrated in FIG. 2.
Figure 4:
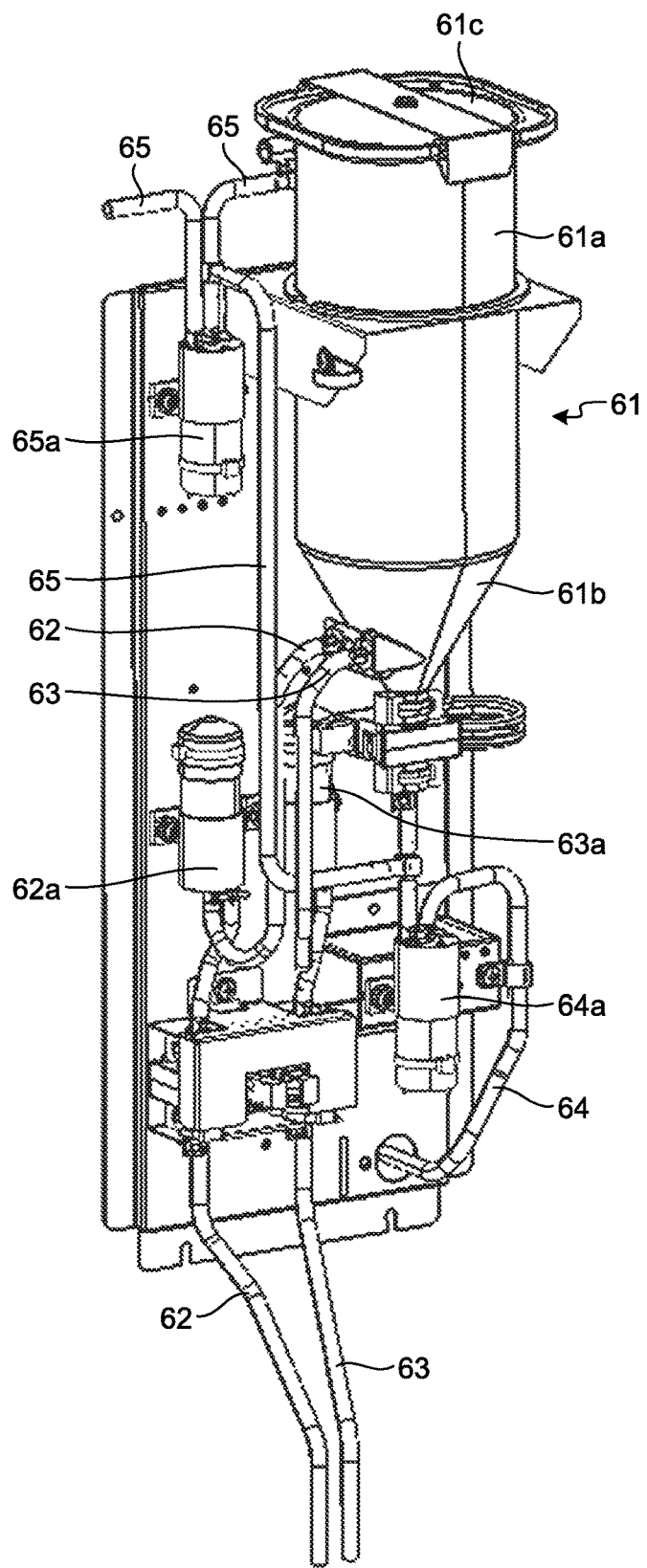
FIG. 4 is a perspective view of the mixing container illustrated in FIG. 2.

FIGS. 3 and 4 each illustrates the mixing container 61 of FIG. 2. More specifically, FIG. 3 is a side view, and FIG. 4 is a perspective view. The mixing container 61 will be described with reference to FIGS. 3 and 4 as appropriate.

The mixing container 61 is in a cylindrical shape with a bottom and specifically has a cylindrical side portion 61a and a conical bottom 61b configured such that its cross-sectional area gradually becomes smaller toward the lower end with the center as the lowermost portion. The upper surface opening of the mixing container 61 is covered by a lid 61c.

The first undiluted wash fluid supply pipe 62 has an end connected to a first undiluted wash fluid accommodating unit 66 accommodating therein alkaline wash fluid and the other end connected to a side surface of the bottom 61b of the mixing container 61 and connects the first undiluted wash fluid accommodating unit 66 with the mixing container 61. The first undiluted wash fluid accommodating unit 66 is disposed in an undiluted wash fluid storage cabinet 110 provided separately from the beverage supply device 10.

A first undiluted wash fluid supply pump 62a is disposed on the first undiluted wash fluid supply pipe 62. The first undiluted wash fluid supply pump 62a drives upon receipt of an instruction from the control unit 100 to supply the alkaline wash fluid from the first undiluted wash fluid accommodating unit 66 to the mixing container 61.

The second undiluted wash fluid supply pipe 63 has an end connected to a second undiluted wash fluid accommodating unit 67 accommodating acid wash fluid and the other end connected to the side surface of the bottom 61b of the mixing container 61 and connects the second undiluted wash fluid accommodating unit 67 with the mixing container 61. As is the case with the first undiluted wash fluid accommodating unit 66, the second undiluted wash fluid accommodating unit 67 is disposed in the undiluted wash fluid storage cabinet 110.

A second undiluted wash fluid supply pump 63a is disposed on the second undiluted wash fluid supply pipe 63. The second undiluted wash fluid supply pump 63a drives upon receipt of an instruction from the control unit 100 to supply the acid wash fluid from the second undiluted wash fluid accommodating unit 67 to the mixing container 61.

Figure 5:
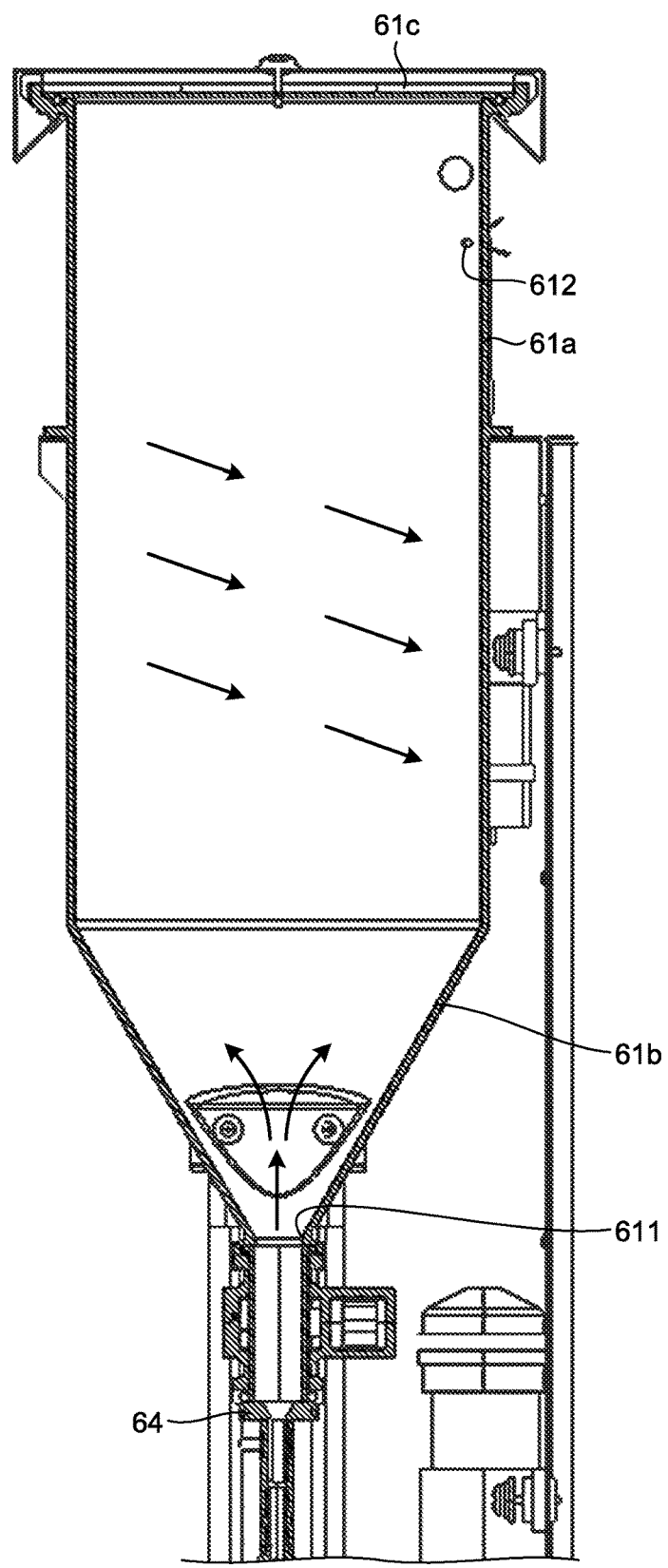
FIG. 5 is a longitudinal cross-sectional view of the mixing container illustrated in FIGS. 3 and 4.

The wash fluid supply pipe 64 has a first end connected to the mixing container 61 and a second end connected to a third connection unit 68 and connects the mixing container 61 with the third connection unit 68. As illustrated in FIG. 5, the first end of the wash fluid supply pipe 64 is connected to the mixing container 61 in such a manner that communicates with a discharge opening 611 provided on the bottom 61b of the mixing container 61. The third connection unit 68 is a connector connectable with the first connection unit 26.

A wash fluid pump 64a is disposed on the wash fluid supply pipe 64. The wash fluid pump 64a drives upon receipt of an instruction from the control unit 100 to supply fluid from the mixing container 61 to the third connection unit 68. The reference numeral 64b in FIG. 2 indicates a check valve. The check valve 64b allows fluid to travel from the mixing container 61 to the third connection unit 68 and restricts the travel of the fluid from the third connection unit 68 to the mixing container 61.

Figure 6:
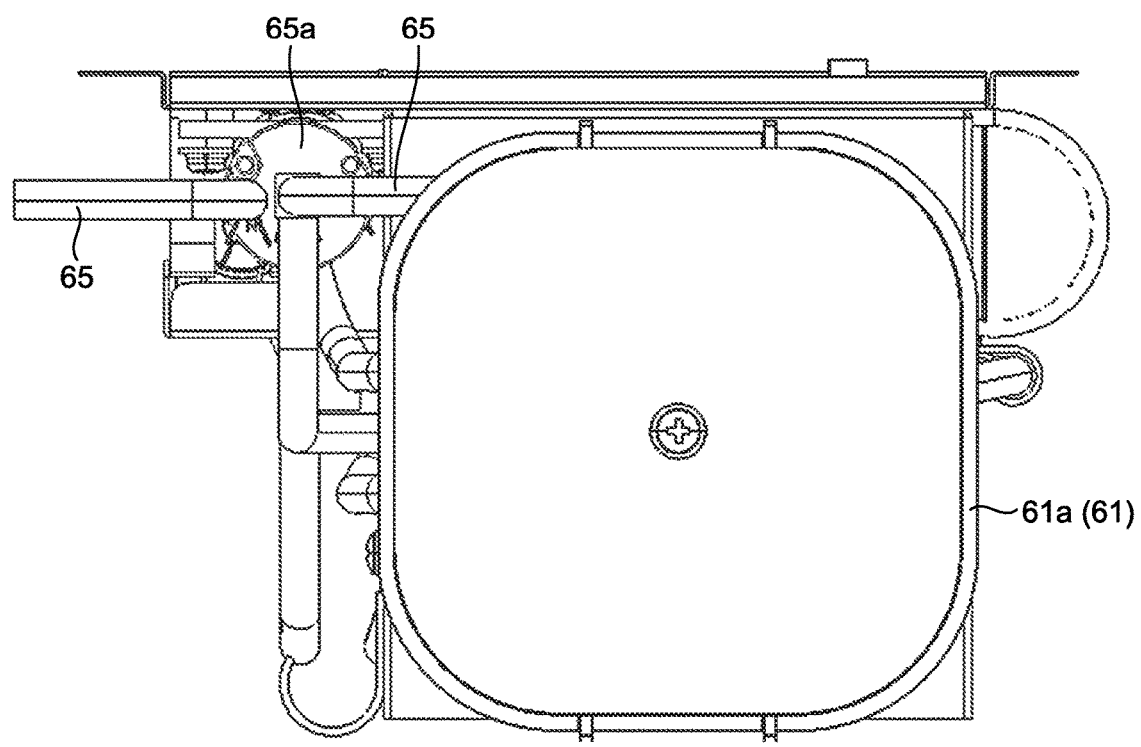
FIG. 6 is a top view of the mixing container illustrated in FIGS. 3 and 4.

The wash hot-water supply pipe 65 has a first end connected to the upstream side of the hot-water supply pipe 24 from the hot-water supply pump 24a. A second end of the wash hot-water supply pipe 65 is branched into two ends so that one end is connected to the wash fluid supply pipe 64 disposed on the upstream side of the wash fluid pump 64a and the other end is connected to the mixing container 61 in such a manner that the hot-water supply pipe 65 is communicated with an upper hot-water supply opening 612 provided in the upper part on the side portion 61a of the mixing container 61. As illustrated in FIG. 6, the wash hot-water supply pipe 65 communicating with the upper hot-water supply opening 612 substantially extends, on the upper hot-water supply opening 612, in the direction of the tangent to the side portion 61a of the mixing container 61.

A wash hot-water pump 65a is disposed on the upstream side of the branch point of the second end of the wash hot-water supply pipe 65. The wash hot-water pump 65a is driven upon receipt of an instruction from a control unit 100 to supply hot water from the hot-water tank 25 to the mixing container 61.

The beverage supply device 10 configured as above can supply milk foamed in the following manner to the cup C.

The control unit 100 opens the first steam supply valve 22a and drives the tube pump 32 and the air pump 42. The second steam supply valve 23a is closed. Furthermore, the first connection unit 26 and the second connection unit 33 are connected with each other, and the third connection unit 68 is disconnected from the first connection unit 26.

The tube pump 32 drives to draw the undiluted milk from the BIB 31 of the undiluted fluid supply unit 30. The undiluted milk drawn from the BIB 31 travels through the tube 34 and thereafter travels through the fluid supply pipe 27. The undiluted milk travels through the fluid supply pipe 27 to the mixing unit 50.

With the first steam supply valve 22a kept open, pressurized steam generated in the steam tank 21 travels through the first steam supply pipe 22 to the mixing unit 50. With the air pump 42 driven, compressed air travels through the air supply pipe 41 to the mixing unit 50.

The undiluted milk is heated by the pressurized steam in the mixing unit 50. Furthermore, the compressed air enters the mixing unit 50 and is mixed with the undiluted milk heated by the pressurized steam, whereby a milk beverage is generated. In this process, the generated milk beverage is slightly foamed by the compressed air. The milk beverage generated in the mixing unit 50 travels through the beverage sending pipe 51 to the foaming unit 52.

The milk beverage contacts with the wall surface and others in the foaming unit 52, which increases the amount of foam in the milk beverage and makes the milk beverage more foamy. The foamed milk beverage is sent out to the nozzle 54 through the beverage induction path and discharged into the cup C from the nozzle 54. In this manner, the milk beverage is supplied.

As illustrated in FIG. 2, when a user gives a wash instruction to the control unit 100 by performing an input operation through a certain input means (not illustrated) with the second connection unit 33 disconnected from the first connection unit 26 and with the third connection unit 68 connected with the first connection unit 26, the control unit 100 performs wash control process. In the following case, each valve is closed, and each pump is in a resting state.

Figure 7:
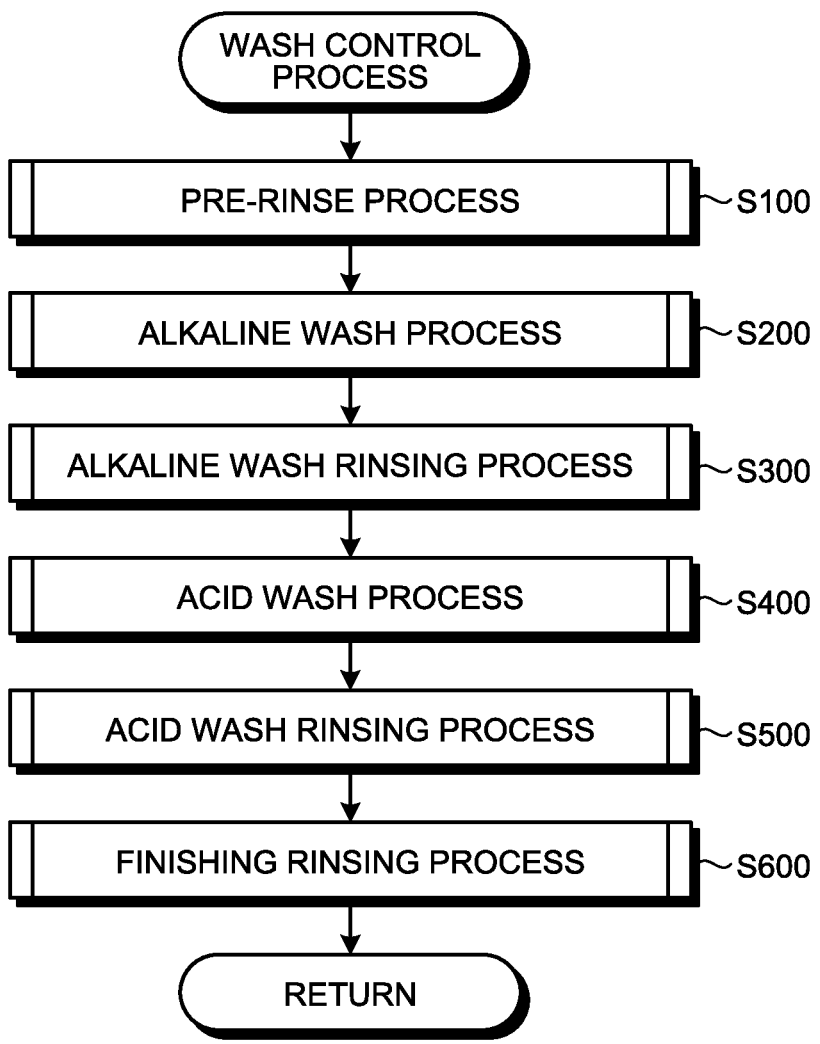
FIG. 7 is a flowchart illustrating a wash control process performed by a control unit.

FIG. 7 is a flowchart illustrating a wash control process performed by the control unit 100. In this wash control process, the control unit 100 performs pre-rinse process (Step S100).

Figure 8:
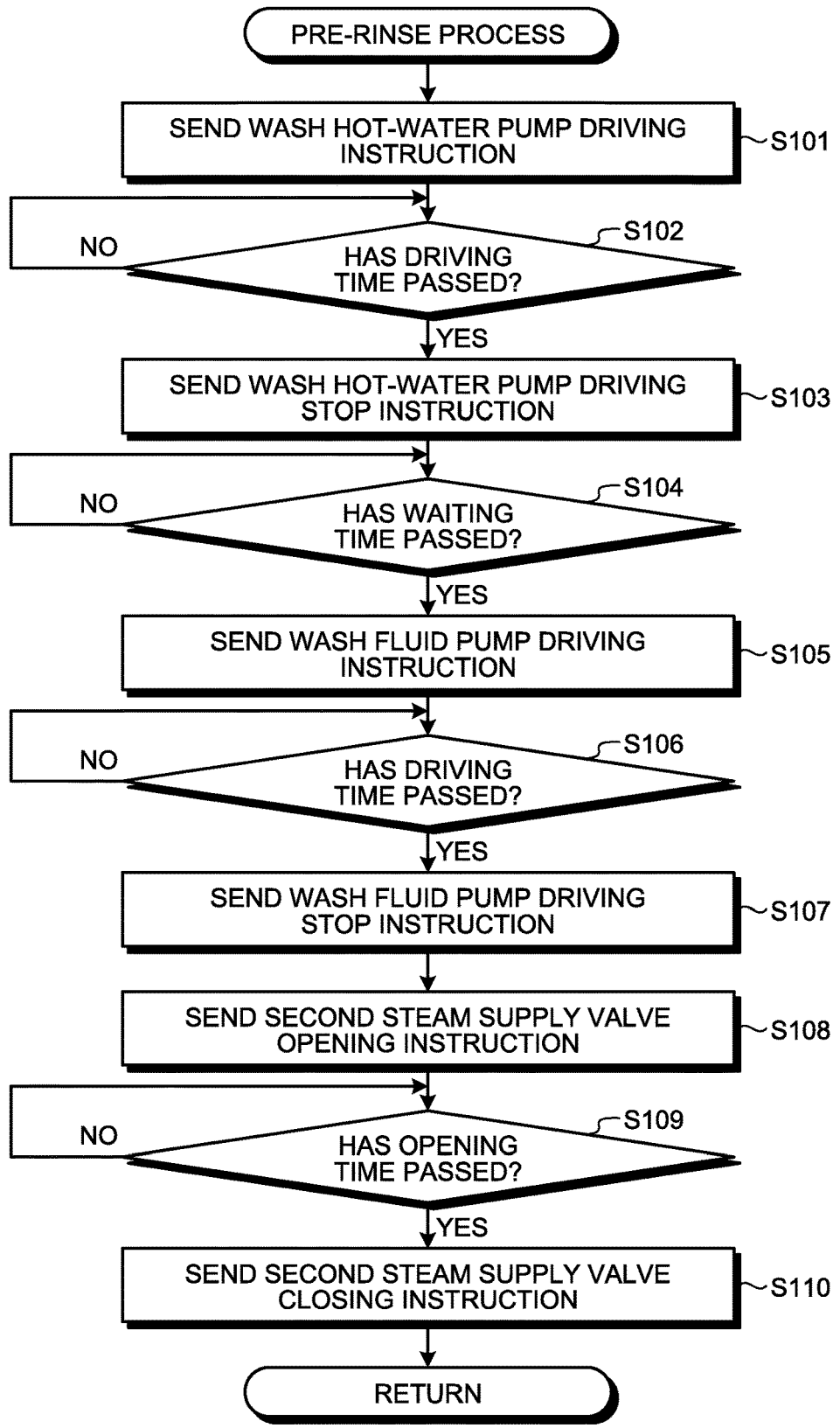
FIG. 8 is a flowchart illustrating a pre-rinse process illustrated in FIG. 7.

FIG. 8 is a flowchart illustrating the pre-rinse process illustrated in FIG. 7. In the pre-rinse process, the control unit 100 sends a driving instruction to the wash hot-water pump 65a (Step S101), starts measuring the time with a built-in clock unit (not illustrated), and waits until a predetermined driving time has passed (Step S102).

With this process, hot water used as wash hot water is supplied from the hot-water tank 25 to the mixing container 61 through the wash hot-water supply pipe 65. As described above, the second end of the wash hot-water supply pipe 65 is branched, and a part of the hot water is discharged upward from the discharge opening 611. Furthermore, because the wash hot-water supply pipe 65 communicating with the upper hot-water supply opening 612 substantially extends, on the upper hot-water supply opening 612, in the direction of the tangent to the side portion 61a of the mixing container 61, the rest of the hot water is discharged from the upper hot-water supply opening 612 and travels helically downward along the inner wall surface of the side portion 61a in the mixing container 61.

When the driving time has passed (Yes at Step S102), the control unit 100 sends a driving stop instruction to the wash hot-water pump 65a (Step S103), starts measuring the time with the clock unit, and waits until a predetermined waiting time has passed (Step S104). The waiting time is determined such that the hot water sent out from the wash hot-water pump 65a definitely reaches the mixing container 61.

When the waiting time has passed (Yes at Step S104), the control unit 100 sends a driving instruction to the wash fluid pump 64a (Step S105), starts measuring the time with the clock unit, and waits until a predetermined driving time has passed (Step S106). With this process, the hot water in the mixing container 61 travels, as wash hot water, from the wash fluid supply pipe 64 through the first connection unit 26, the fluid supply pipe 27, the mixing unit 50, the beverage sending pipe 51, the foaming unit 52, the beverage induction path, and the nozzle 54, which configure the beverage supply route.

When the driving time has passed (Yes at Step S106), the control unit 100 sends a driving stop instruction to the wash fluid pump 64a and gives an opening instruction to the second steam supply valve 23a (Step S107 and Step S108). When the control unit 100 gives the opening instruction to the second steam supply valve 23a, the control unit 100 starts measuring the time with the clock unit and waits until a predetermined opening time has passed (Step S109).

The second steam supply valve 23a is kept open until the opening time has passed. This process allows the pressurized steam having traveled through the second steam supply pipe 23 to thereafter travel through the first connection unit 26, the fluid supply pipe 27, the mixing unit 50, the beverage sending pipe 51, the foaming unit 52, the beverage induction path, and the nozzle 54, thereby blowing the hot water supplied at Step S105.

When the opening time has passed (Yes at Step S109), the control unit 100 sends a closing instruction to the second steam supply valve 23a (Step S110), and returns the procedure to end this pre-rinse process.

After completion of the pre-rinse process, the control unit 100 performs alkaline wash process (Step S200).

Figure 9:
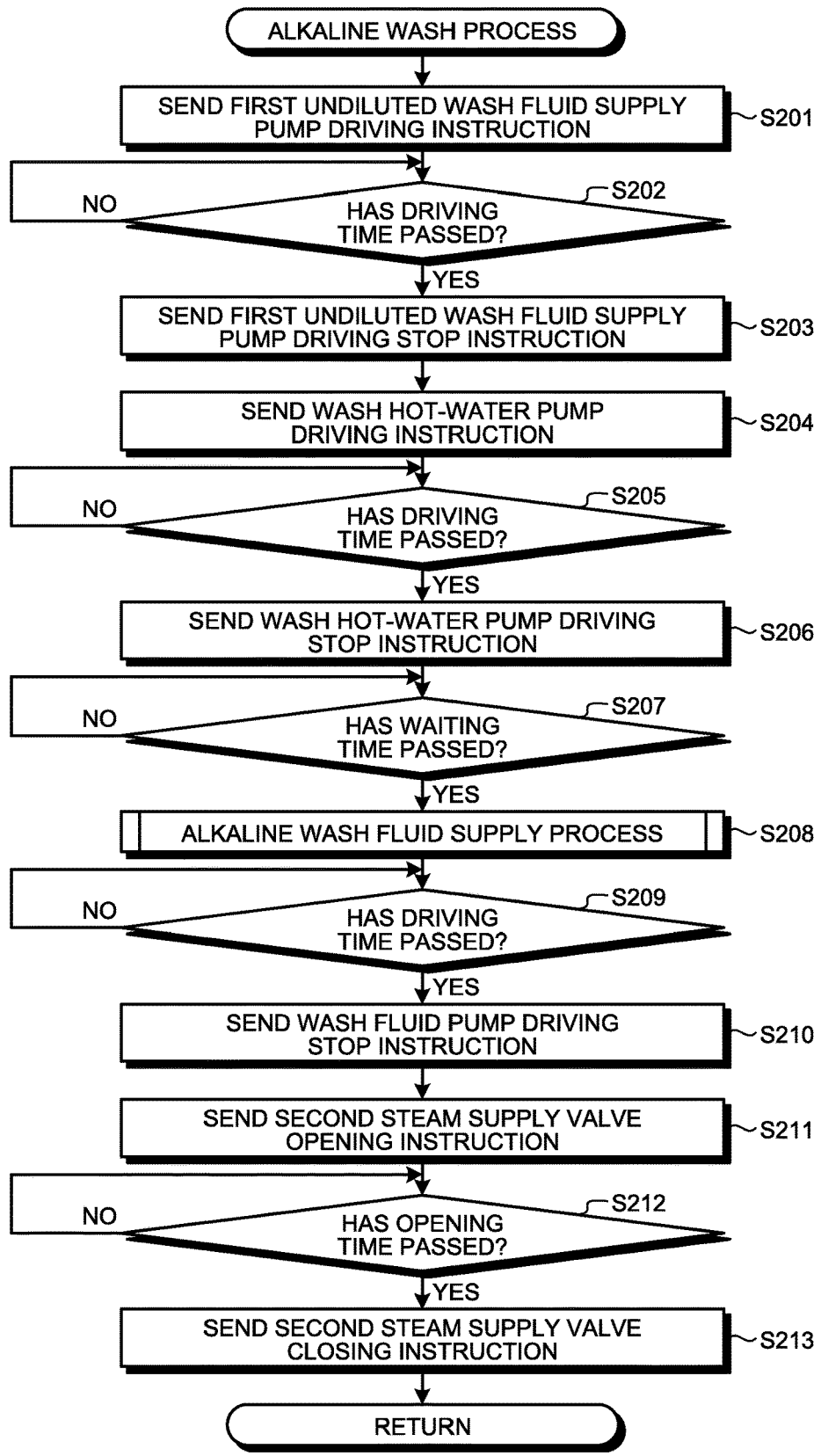
FIG. 9 is a flowchart illustrating an alkaline wash process illustrated in FIG. 7.

FIG. 9 is a flowchart illustrating the alkaline wash process illustrated in FIG. 7. In the alkaline wash process, the control unit 100 sends a driving instruction to the first undiluted wash fluid supply pump 62a (Step S201), starts measuring the time with the clock unit, and waits until a predetermined driving time has passed (Step S202).

When the driving time has passed (Yes at Step S202), the control unit 100 sends a driving stop instruction to the first undiluted wash fluid supply pump 62a (Step S203).

The first undiluted wash fluid supply pump 62a drives during the above-described driving time, whereby a certain amount of undiluted alkaline wash fluid accommodated in the first undiluted wash fluid accommodating unit 66 is supplied to the mixing container 61. The undiluted alkaline wash fluid supplied to the mixing container 61 is particularly stored in the lower part of the mixing container 61.

The control unit 100 sends a driving instruction to the wash hot-water pump 65a (Step S204), starts measuring the time with the clock unit, and waits until a predetermined driving time has passed (Step S205). With this process, hot water used as wash hot water is supplied from the hot-water tank 25 to the mixing container 61 through the wash hot-water supply pipe 65. As described above, the second end of the wash hot-water supply pipe 65 is branched. With this configuration, a part of the hot water is discharged upward from the discharge opening 611, whereas the rest of the hot water travels helically downward from the upper hot-water supply opening 612 along the inner wall surface of the side portion 61a in the mixing container 61. The stored undiluted alkaline wash fluid and the hot water (the wash hot water) are sufficiently well stirred in this process, and alkaline wash fluid is accordingly generated.

When the driving time has passed (Yes at Step S205), the control unit 100 sends a driving stop instruction to the wash hot-water pump 65a (Step S206), starts measuring the time with the clock unit, and waits until a predetermined waiting time has passed (Step S207). As is the case with the above-described pre-rinse process, this waiting time is determined such that the hot water sent out from the wash hot-water pump 65a definitely reaches the mixing container 61.

When the waiting time has passed (Yes at Step S207), the control unit 100 performs alkaline wash fluid supply process (Step S208).

Figure 10:
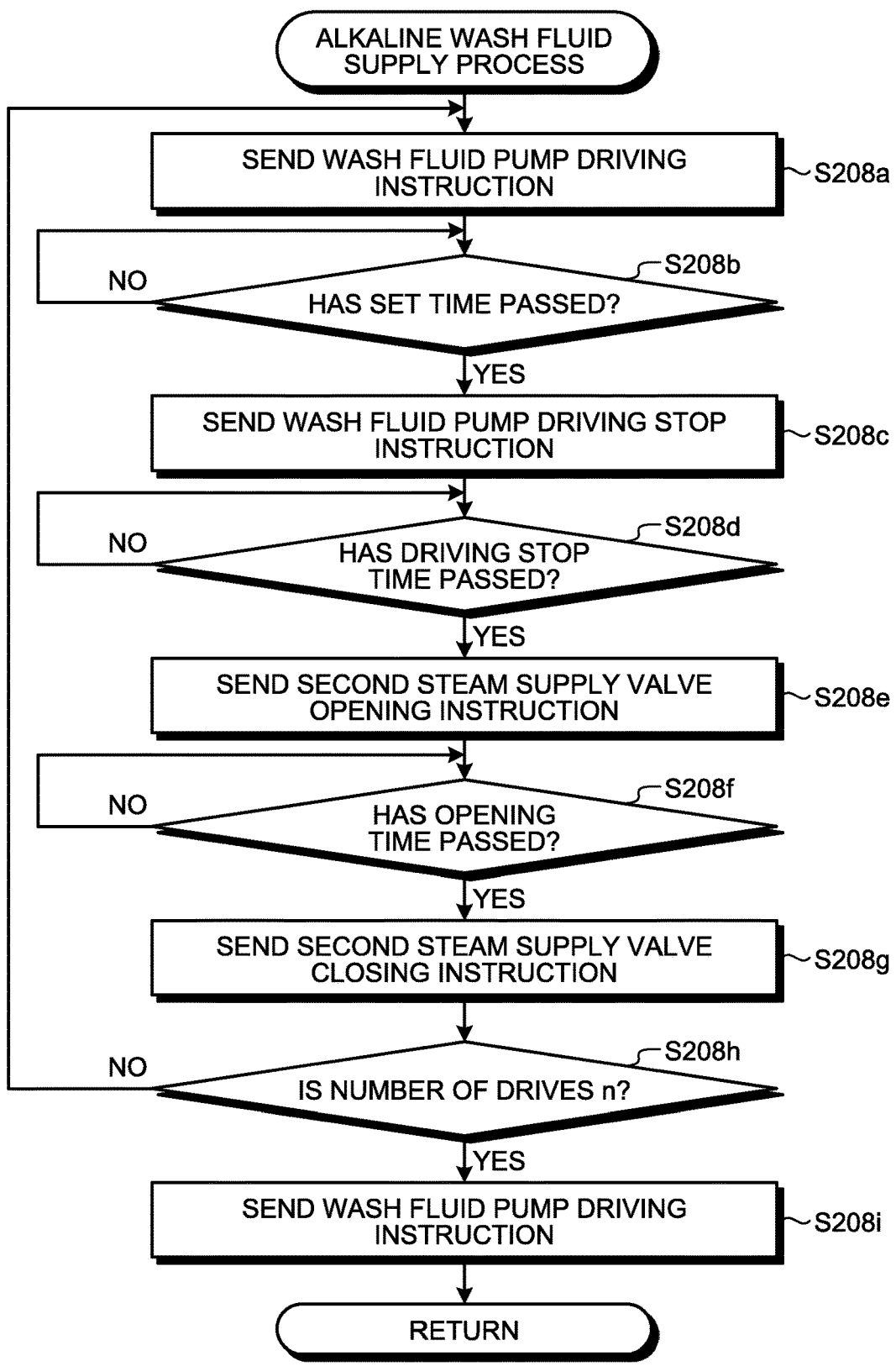
FIG. 10 is a flowchart illustrating an alkaline wash fluid supply process illustrated in FIG. 9.

FIG. 10 is a flowchart illustrating the alkaline wash fluid supply process illustrated in FIG. 9. In this alkaline wash fluid supply process, the control unit 100 sends a driving instruction to the wash fluid pump 64a (Step S208a), starts measuring the time with the clock unit, and waits until a predetermined set time has passed (Step S208b).

The alkaline wash fluid in the mixing container 61 accordingly travels from the wash fluid supply pipe 64 through the first connection unit 26, the fluid supply pipe 27, the mixing unit 50, the beverage sending pipe 51, the foaming unit 52, the beverage induction path, and the nozzle 54, which configure the beverage supply route.

When the predetermined set time has passed (Yes at Step S208b), the control unit 100 sends a driving stop instruction to the wash fluid pump 64a (Step S208c), starts measuring the time with the clock unit, and waits until a predetermined driving stop time has passed (Step S208d).

This process allows the wash fluid pump 64a to intermittently drive, that is, to drive during the predetermined set time and stop driving during the driving stop time.

When the driving stop time has passed (Yes at Step S208d), the control unit 100 sends an opening instruction to the second steam supply valve 23a (Step S208e), starts measuring the time with the clock unit, and waits until a predetermined opening time has passed (Step S208f).

When the opening time has passed (Yes at Step S208f), the control unit 100 sends a closing instruction to the second steam supply valve 23a (Step S208g) and determines whether the wash fluid pump 64a has driven as many times as n, which is a predetermined number of drives of the wash fluid pump 64a (Step S208h).

If the number of drives of the wash fluid pump 64a is less than n (No at Step S208h), the control unit 100 repeats the process of the above-described Step S208a to Step S208g.

On the other hand, if the number of drives of the wash fluid pump 64a reaches n (Yes at Step S208h), the control unit 100 sends a driving instruction to the wash fluid pump 64a (Step S208i), and returns the procedure to end this alkaline wash fluid supply process.

After completion of the alkaline wash fluid supply process, when the time measured by the clock unit from completion of Step S208i has exceeded a predetermined driving time (Yes at Step S209), the control unit 100 determines that the alkaline wash fluid stored in the mixing container 61 has all been supplied and sends a driving stop instruction to the wash fluid pump 64a (Step S210).

The control unit 100 gives an opening instruction to the second steam supply valve 23a (Step S211), starts measuring the time with the clock unit, and waits until a predetermined opening time has passed (Step S212). This process can blow the alkaline wash fluid supplied through the above-described procedure.

When the opening time has passed (Yes at Step S212), the control unit 100 sends a closing instruction to the second steam supply valve 23a (Step S213), and returns the procedure to end this alkaline wash process.

After completion of the alkaline wash process, the control unit 100 performs alkaline wash rinsing process (Step S300).

Figure 11:
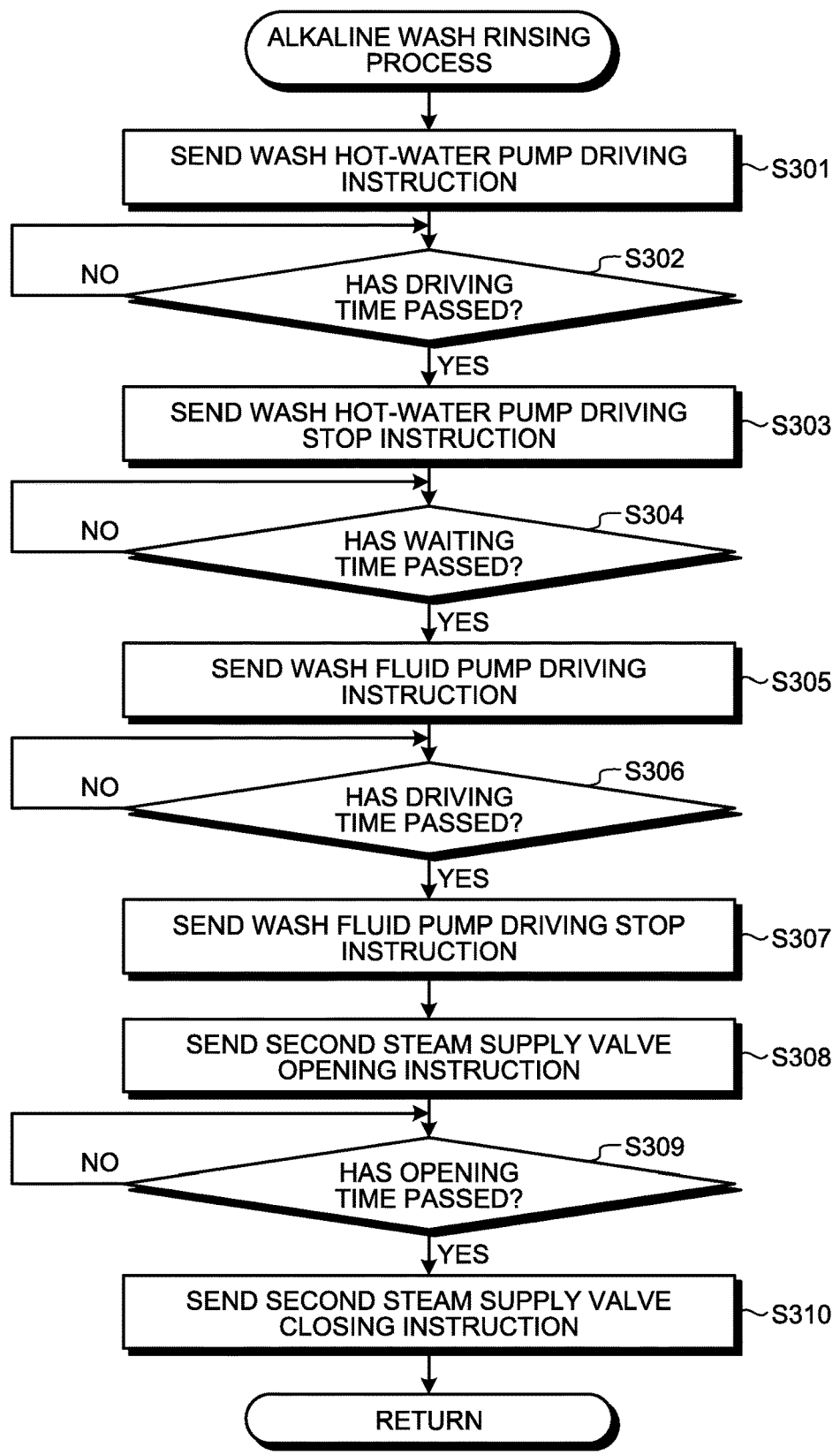
FIG. 11 is a flowchart illustrating an alkaline wash rinsing process illustrated in FIG. 7.

FIG. 11 is a flowchart illustrating the alkaline wash rinsing process illustrated in FIG. 7. In this alkaline wash rinsing process, the control unit 100 sends a driving instruction to the wash hot-water pump 65a (Step S301), starts measuring the time with the clock unit, and waits until a predetermined driving time has passed (Step S302).

With this process, hot water used as wash hot water is supplied from the hot-water tank 25 to the mixing container 61 through the wash hot-water supply pipe 65. As described above, the second end of the wash hot-water supply pipe 65 is branched, and a part of the hot water is discharged upward from the discharge opening 611. Furthermore, because the wash hot-water supply pipe 65 communicating with the upper hot-water supply opening 612 substantially extends, on the upper hot-water supply opening 612, in the direction of the tangent to the side portion 61a of the mixing container 61, the rest of the hot water is discharged from the upper hot-water supply opening 612 and travels helically downward along the inner wall surface of the side portion 61a in the mixing container 61.

When the driving time has passed (Yes at Step S302), the control unit 100 sends a driving stop instruction to the wash hot-water pump 65a (Step S303), starts measuring the time with the clock unit, and waits until a predetermined waiting time has passed (Step S304). The waiting time is determined such that the hot water sent out from the wash hot-water pump 65a definitely reaches the mixing container 61.

When the waiting time has passed (Yes at Step S304), the control unit 100 sends a driving instruction to the wash fluid pump 64a (Step S305), starts measuring the time with the clock unit, and waits until a predetermined driving time has passed (Step S306). With this process, the hot water in the mixing container 61 travels, as wash hot water, from the wash fluid supply pipe 64 through the first connection unit 26, the fluid supply pipe 27, the mixing unit 50, the beverage sending pipe 51, the foaming unit 52, the beverage induction path, and the nozzle 54, which configure the beverage supply route.

When the driving time has passed (Yes at Step S306), the control unit 100 sends a driving stop instruction to the wash fluid pump 64a and gives an opening instruction to the second steam supply valve 23a (Step S307 and Step S308). When the control unit 100 gives the opening instruction to the second steam supply valve 23a, the control unit 100 starts measuring the time with the clock unit and waits until a predetermined opening time has passed (Step S309).

The second steam supply valve 23a is kept open until the opening time has passed. This process allows the pressurized steam having traveled through the second steam supply pipe 23 to thereafter travel through the first connection unit 26, the fluid supply pipe 27, the mixing unit 50, the beverage sending pipe 51, the foaming unit 52, the beverage induction path, and the nozzle 54, thereby blowing the hot water supplied at Step S305.

When the opening time has passed (Yes at Step S309), the control unit 100 sends a closing instruction to the second steam supply valve 23a (Step S310), and returns the procedure to end this alkaline wash rinsing process.

After completion of the alkaline wash rinsing process, the control unit 100 performs acid wash process (Step S400).

Figure 12:
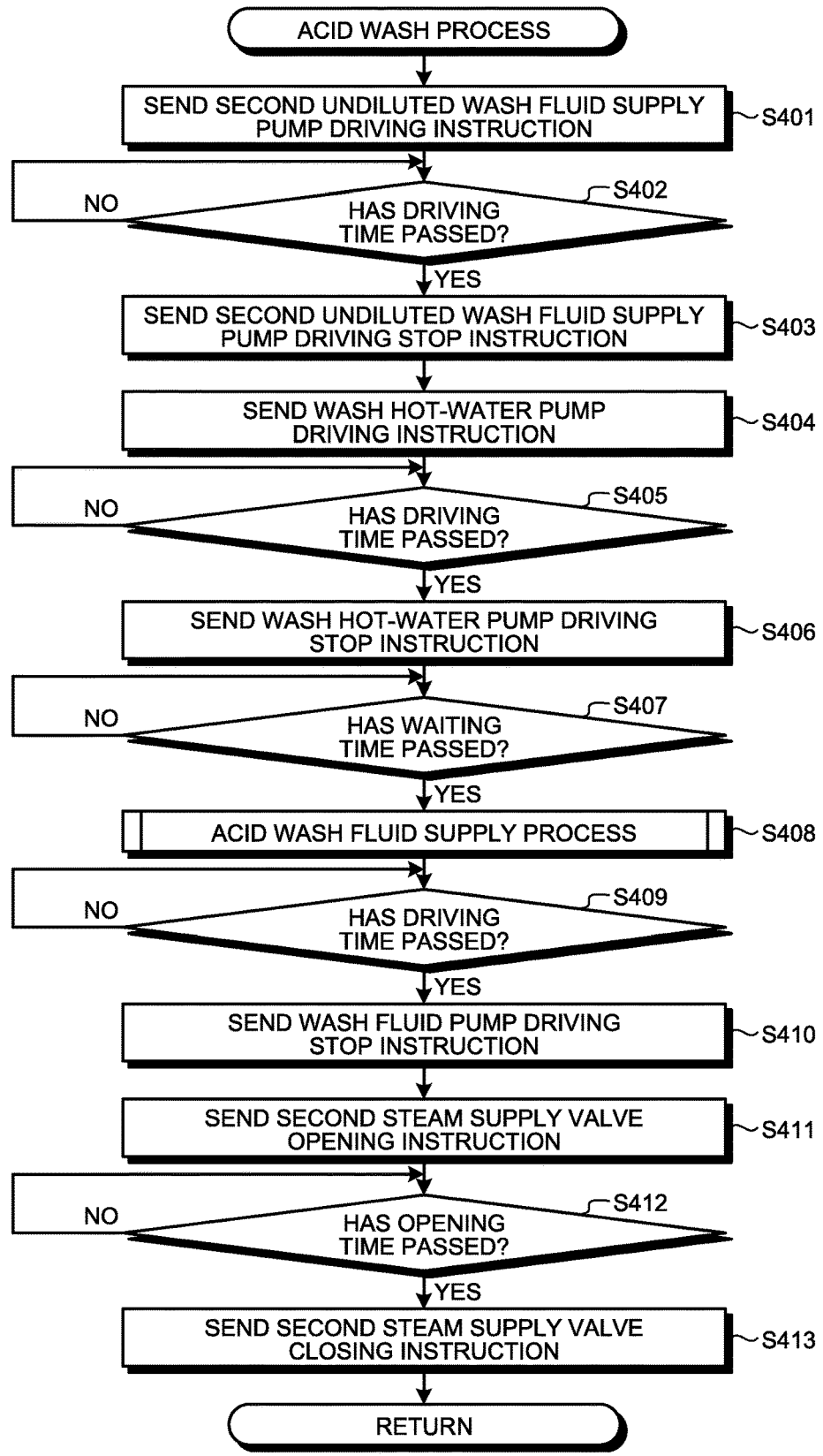
FIG. 12 is a flowchart illustrating an acid wash process illustrated in FIG. 7.

FIG. 12 is a flowchart illustrating the acid wash process illustrated in FIG. 7. In this acid wash process, the control unit 100 sends a driving instruction to the second undiluted wash fluid supply pump 63a (Step S401), starts measuring the time with the clock unit, and waits until a predetermined driving time has passed (Step S402).

When the driving time has passed (Yes at Step S402), the control unit 100 sends a driving stop instruction to the second undiluted wash fluid supply pump 63a (Step S403).

The second undiluted wash fluid supply pump 63a drives during the above-described driving time, whereby a certain amount of undiluted acid wash fluid accommodated in the second undiluted wash fluid accommodating unit 67 is supplied to the mixing container 61. The undiluted acid wash fluid supplied to the mixing container 61 is particularly stored in the lower part of the mixing container 61.

The control unit 100 sends a driving instruction to the wash hot-water pump 65a (Step S404), starts measuring the time with the clock unit, and waits until a predetermined driving time has passed (Step S405).

With this process, hot water used as wash hot water is supplied from the hot-water tank 25 to the mixing container 61 through the wash hot-water supply pipe 65. As described above, the second end of the wash hot-water supply pipe 65 is branched. A part of the hot water is discharged upward from the discharge opening 611, whereas the rest of the hot water travels helically downward from the upper hot-water supply opening 612 along the inner wall surface of the side portion 61a in the mixing container 61. The stored undiluted acid wash fluid and the hot water (the wash hot water) are sufficiently well stirred in this process, which accordingly generates acid wash fluid.

When the driving time has passed (Yes at Step S405), the control unit 100 sends a driving stop instruction to the wash hot-water pump 65a (Step S406), starts measuring the time with the clock unit, and waits until a predetermined waiting time has passed (Step S407). As is the case with the above-described pre-rinse process, this waiting time is determined such that the hot water sent out from the wash hot-water pump 65a definitely reaches the mixing container 61.

When the waiting time has passed (Yes at Step S407), the control unit 100 performs acid wash fluid supply process (Step S408).

Figure 13:
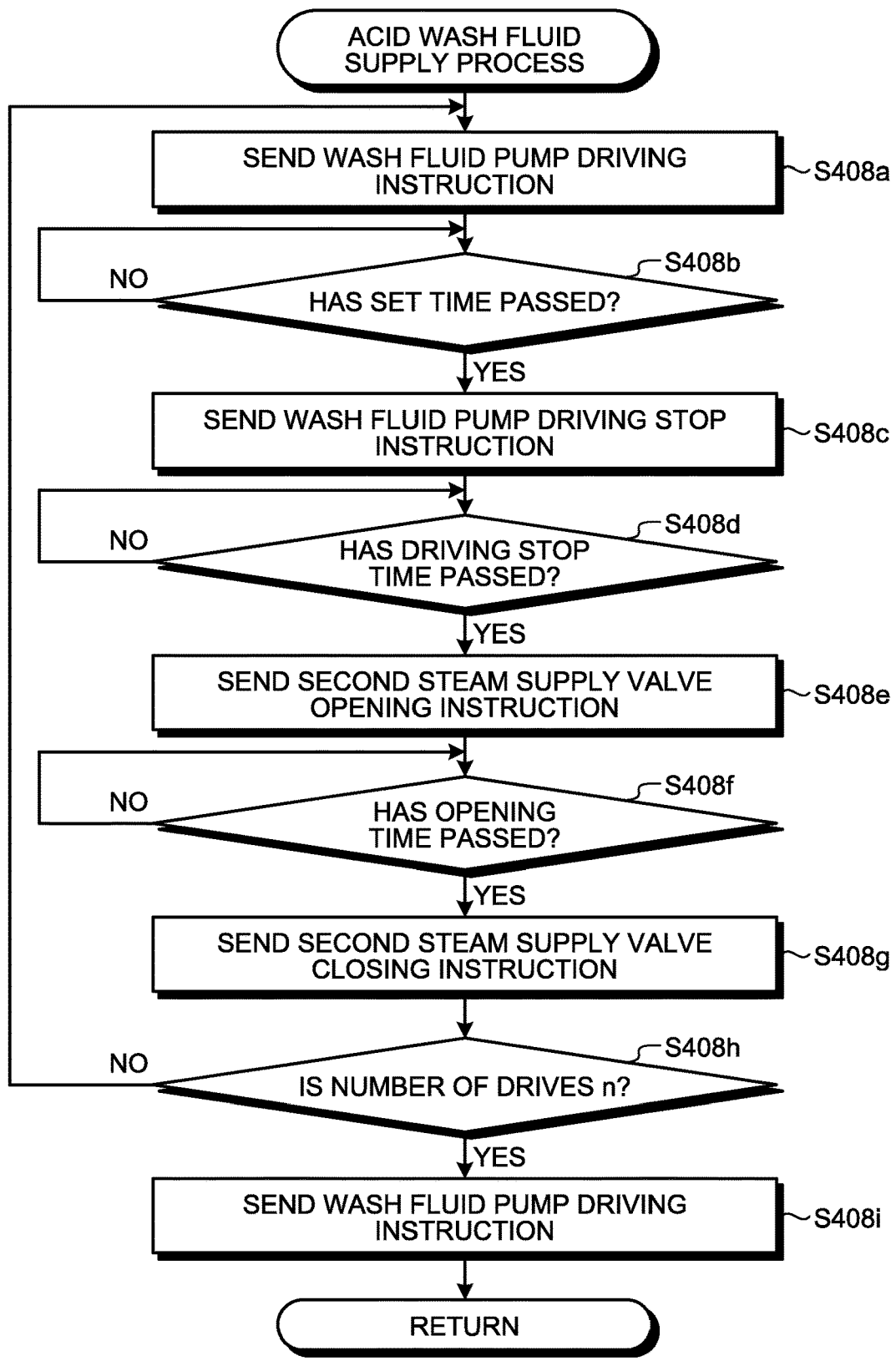
FIG. 13 is a flowchart illustrating an acid wash fluid supply process illustrated in FIG. 12.

FIG. 13 is a flowchart illustrating the acid wash fluid supply process illustrated in FIG. 12. In this acid wash fluid supply process, the control unit 100 sends a driving instruction to the wash fluid pump 64a (Step S408a), starts measuring the time with the clock unit, and waits until a predetermined set time has passed (Step S408b). The acid wash fluid in the mixing container 61 accordingly travels from the wash fluid supply pipe 64 through the first connection unit 26, the fluid supply pipe 27, the mixing unit 50, the beverage sending pipe 51, the foaming unit 52, the beverage induction path, and the nozzle 54, which configure the beverage supply route.

When the predetermined set time has passed (Yes at Step S408b), the control unit 100 sends a driving stop instruction to the wash fluid pump 64a (Step S408c), starts measuring the time with the clock unit, and waits until a predetermined driving stop time has passed (Step S408d).

This process allows the wash fluid pump 64a to intermittently drive, that is, to drive during the predetermined set time and stop driving during the driving stop time.

When the driving stop time has passed (Yes at Step S408d), the control unit 100 sends an opening instruction to the second steam supply valve 23a (Step S408e), starts measuring the time with the clock unit, and waits until a predetermined opening time has passed (Step S408f).

When the opening time has passed (Yes at Step S408f), the control unit 100 sends a closing instruction to the second steam supply valve 23a (Step S408g) and determines whether the wash fluid pump 64a has driven as many times as n, which is a predetermined number of drives of the wash fluid pump 64a (Step S408h).

If the number of drives of the wash fluid pump 64a is less than n (No at Step S408h), the control unit 100 repeats the process of the above-described Step S408a to Step S408g. On the other hand, if the number of drives of the wash fluid pump 64a reaches n (Yes at Step S408h), the control unit 100 sends a driving instruction to the wash fluid pump 64a (Step S408i), and returns the procedure to end this acid wash fluid supply process.

After completion of the acid wash fluid supply process, when the time measured by the clock unit from completion of Step S408i has exceeded a predetermined driving time (Yes at Step S409), the control unit 100 determines that the acid wash fluid stored in the mixing container 61 has all been supplied and sends a driving stop instruction to the wash fluid pump 64a (Step S410).

The control unit 100 gives an opening instruction to the second steam supply valve 23a (Step S411), starts measuring the time with the clock unit, and waits until a predetermined opening time has passed (Step S412). This process can blow the acid wash fluid supplied through the above-described procedure.

When the opening time has passed (Yes at Step S412), the control unit 100 sends a closing instruction to the second steam supply valve 23a (Step S413), and returns the procedure to end this acid wash process.

After completion of the acid wash process, the control unit 100 performs an acid wash rinsing process (Step S500).

FIG. 14 is a flowchart illustrating the acid wash rinsing process illustrated in FIG. 7. In this acid wash rinsing process, the control unit 100 sends a driving instruction to the wash hot-water pump 65a (Step S501), starts measuring the time with the clock unit, and waits until a predetermined driving time has passed (Step S502). With this process, hot water used as wash hot water is supplied from the hot-water tank 25 to the mixing container 61 through the wash hot-water supply pipe 65. As described above, the second end of the wash hot-water supply pipe 65 is branched, and a part of the hot water is discharged upward from the discharge opening 611. Furthermore, because the wash hot-water supply pipe 65 communicating with the upper hot-water supply opening 612 substantially extends, on the upper hot-water supply opening 612, in the direction of the tangent to the side portion 61a of the mixing container 61, the rest of the hot water is discharged from the upper hot-water supply opening 612 and travels helically downward along the inner wall surface of the side portion 61a in the mixing container 61.

When the driving time has passed (Yes at Step S502), the control unit 100 sends a driving stop instruction to the wash hot-water pump 65a (Step S503), starts measuring the time with the clock unit, and waits until a predetermined waiting time has passed (Step S504). The waiting time is determined such that the hot water sent out from the wash hot-water pump 65a definitely reaches the mixing container 61.

When the waiting time has passed (Yes at Step S504), the control unit 100 sends a driving instruction to the wash fluid pump 64a (Step S505), starts measuring the time with the clock unit, and waits until a predetermined driving time has passed (Step S506). With this process, the hot water in the mixing container 61 travels as wash hot water from the wash fluid supply pipe 64 through the first connection unit 26, the fluid supply pipe 27, the mixing unit 50, the beverage sending pipe 51, the foaming unit 52, the beverage induction path, and the nozzle 54, which configure the beverage supply route.

When the driving time has passed (Yes at Step S506), the control unit 100 sends a driving stop instruction to the wash fluid pump 64a and gives an opening instruction to the second steam supply valve 23a (Step S507 and Step S508). When the control unit 100 gives the opening instruction to the second steam supply valve 23a, the control unit 100 starts measuring the time with the clock unit and waits until a predetermined opening time has passed (Step S509).

The second steam supply valve 23a is kept open until the opening time has passed. This process allows the pressurized steam having traveled through the second steam supply pipe 23 to thereafter travel through the first connection unit 26, the fluid supply pipe 27, the mixing unit 50, the beverage sending pipe 51, the foaming unit 52, the beverage induction path, and the nozzle 54, thereby blowing the hot water supplied at Step S505.

When the opening time has passed (Yes at Step S509), the control unit 100 sends a closing instruction to the second steam supply valve 23a (Step S510), and returns the procedure to end this acid wash rinsing process.

After completion of the acid wash rinsing process, the control unit 100 performs finishing rinsing process (Step S600).

FIG. 15 is a flowchart illustrating the finishing rinsing process illustrated in FIG. 7. In this finishing rinsing process, the control unit 100 sends a driving instruction to the wash hot-water pump 65a (Step S601), starts measuring the time with the clock unit, and waits until a predetermined driving time has passed (Step S602).

With this process, hot water used as wash hot water is supplied from the hot-water tank 25 to the mixing container 61 through the wash hot-water supply pipe 65. As described above, the second end of the wash hot-water supply pipe 65 is bifurcated, and a part of the hot water is discharged upward from the discharge opening 611. Furthermore, because the wash hot-water supply pipe 65 communicating with the upper hot-water supply opening 612 substantially extends, on the upper hot-water supply opening 612, in the direction of the tangent to the side portion 61a of the mixing container 61, the rest of the hot water is discharged from the upper hot-water supply opening 612 and travels helically downward along the inner wall surface of the side portion 61a in the mixing container 61.

When the driving time has passed (Yes at Step S602), the control unit 100 sends a driving stop instruction to the wash hot-water pump 65a (Step S603), starts measuring the time with the clock unit, and waits until a predetermined waiting time has passed (Step S604). The waiting time is determined such that the hot water sent out from the wash hot-water pump 65a definitely reaches the mixing container 61.

When the waiting time has passed (Yes at Step S604), the control unit 100 sends a driving instruction to the wash fluid pump 64a (Step S605), starts measuring the time with the clock unit, and waits until a predetermined driving time has passed (Step S606). With this process, the hot water in the mixing container 61 travels, as wash hot water, from the wash fluid supply pipe 64 through the first connection unit 26, the fluid supply pipe 27, the mixing unit 50, the beverage sending pipe 51, the foaming unit 52, the beverage induction path, and the nozzle 54, which configure the beverage supply route.

When the driving time has passed (Yes at Step S606), the control unit 100 sends a driving stop instruction to the wash fluid pump 64a and gives an opening instruction to the second steam supply valve 23a (Step S607 and Step S608). When the control unit 100 gives the opening instruction to the second steam supply valve 23a, the control unit 100 starts measuring the time with the clock unit and waits until a predetermined opening time has passed (Step S609).

The second steam supply valve 23a is kept open until the opening time has passed. This process allows the pressurized steam having traveled through the second steam supply pipe 23 to thereafter travel through the first connection unit 26, the fluid supply pipe 27, the mixing unit 50, the beverage sending pipe 51, the foaming unit 52, the beverage induction path, and the nozzle 54, thereby blowing the hot water supplied at Step S605.

When the opening time has passed (Yes at Step S609), the control unit 100 sends a closing instruction to the second steam supply valve 23a (Step S610) and determines whether the wash hot-water pump 65a and the wash fluid pump 64a have driven as many times as m, which is the number of drives predetermined for each of the wash hot-water pump 65a and the wash fluid pump 64a (Step S611).

In each of the wash hot-water pump 65a and the wash fluid pump 64a, if the number of drives is less than m (No at Step S611), the control unit 100 repeats the process of the above-described Step S601 to Step S610. On the other hand, in each of the wash hot-water pump 65a and the wash fluid pump 64a, if the number of drives reaches m (Yes at Step S611), the control unit 100 sends a washing completion signal to an upper apparatus or a display unit (Step S612), and returns the procedure to end this finishing rinsing process. After completion of the finishing rinsing process, the control unit 100 returns the procedure of the above-described wash control process to end this wash control process.

As described above, in the beverage supply device 10 according to an embodiment of the present disclosure, upon receipt of a washing instruction, a washing unit 60 generates wash fluid by mixing undiluted wash fluid supplied from the undiluted wash fluid accommodating units 66 and 67 with hot water (wash hot water) supplied from the hot-water tank 25, supplies the wash fluid to a beverage supply route communicating with the washing unit 60, and further supplies the hot water supplied from the hot-water tank 25 to the beverage supply route as rinse hot water. Unlike a conventional method, this configuration does not need operations of connecting and disconnecting the wash fluid storage unit or operations of connecting and disconnecting the rinse hot-water storage unit. The beverage supply route can be washed merely by giving a washing instruction. Consequently, the beverage supply route can be washed in an easier manner with this method.

More specifically, the wash fluid is intermittently supplied from the washing unit 60, which exerts more advantageous effects in washing the beverage supply route.

Furthermore, the mixing container 61 of the washing unit 60 supplies the wash hot water upward from the discharge opening 611 and supplies the wash hot water helically downward from the upper hot-water supply opening 612 along the inner wall surface of the side portion 61a with the undiluted wash fluid stored in the mixing container 61. With this configuration, the undiluted wash fluid and the wash hot water can be sufficiently well stirred, which can generate successfully (preferably) diluted wash fluid.

A preferred embodiment of the present disclosure has been described; however, the present disclosure is not limited to this embodiment, and various changes can be made.

In the above-described embodiment, milk is used as an example of milk beverages; however, another milk beverage such as soy milk may also be used in the present disclosure.

In the above-described embodiment, the beverage supply route is washed with the first connection unit 26 disconnected from the second connection unit 33 and with the third connection unit 68 connected with the first connection unit 26. Instead of this configuration, in the present disclosure, the beverage supply route may be washed with the first connection unit 26, the second connection unit 33, and the third connection unit 68 connected with one another. This configuration requires no such processes that disconnect the second connection unit 33 from the first connection unit 26 and connect the third connection unit 68 with the first connection unit 26, whereby the beverage supply route can be washed in an easier manner.

According to an embodiment of the present disclosure, upon receipt of a washing instruction, a washing unit generates wash fluid by mixing undiluted wash fluid supplied from an undiluted wash fluid accommodating unit accommodating therein undiluted wash fluid with wash hot water that is hot water supplied from a hot water storage unit storing therein hot water for generating pressurized steam for forming a milk beverage, supplies the wash fluid to a beverage supply route communicating with the washing unit, and supplies hot water supplied from the hot water storage unit to the beverage supply route as rinse hot water. Unlike with conventional methods, this configuration requires no operations of connecting and disconnecting the wash fluid storage unit or operations of connecting and disconnecting the rinse hot-water storage unit. The beverage supply route can be washed merely by giving the washing unit a washing instruction. Consequently, with this method, the beverage supply route can be washed in an easier manner.

Furthermore, according to an embodiment of the present disclosure, with a mixing container in a cylindrical shape with a bottom storing therein the undiluted wash fluid, the wash hot water is supplied upward from a discharge opening formed on the bottom and is supplied helically downward along the inner wall surface of the side portion from an upper hot-water supply opening formed in the upper part on the side portion. With this configuration, the undiluted wash fluid and the wash hot water can be sufficiently well stirred, thereby generating successfully diluted wash fluid.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A beverage supply device for a beverage dispenser providing a beverage to a beverage container, comprising:
   an undiluted wash fluid accommodating unit for accommodating and supplying undiluted wash fluid;
   a hot water storage unit for storing hot water, the hot water storage unit supplying the hot water as steam hot water for generating pressurized steam to form the beverage and supplying the hot water as wash hot water for washing a beverage supply route along which the beverage is supplied to the beverage container; and a washing unit connected to the undiluted wash fluid accommodating unit to receive the undiluted wash fluid and connected to the hot water storage unit to receive the wash hot water, for washing the beverage supply route, the washing unit including a mixing container, and a wash hot-water supply pipe for supplying the mixing container with the wash hot water received from the hot water storage unit, the mixing container having a cylindrical side portion, a bottom arranged at a lower part of the cylindrical side portion for storing the undiluted wash fluid received from the undiluted wash fluid accommodating unit, a discharge opening arranged at the bottom for supplying upwardly the wash hot water received from the hot water storage unit, and an upper hot-water supply opening arranged at an upper part of the cylindrical side portion, wherein the wash hot-water supply pipe is connected to the mixing container to communicate with the upper hot-water supply opening of the mixing container, and extends, on the upper hot-water supply opening, in a direction of a tangent to the cylindrical side portion of the mixing container to supply the wash hot water helically downward along an inner wall surface of the cylindrical side portion to mix the undiluted wash fluid with the wash hot water to generate a wash fluid, and wherein the washing unit is configured to receive the undiluted wash fluid being supplied from the undiluted wash fluid accommodating unit and stored at the bottom of the mixing container, receive the wash hot water being supplied from the hot water storage unit through the discharge opening and the upper hot-water supply opening, and mix the undiluted wash fluid at the bottom to generate the wash fluid, supply the wash fluid to the beverage supply route communicating with the washing unit, and supply the hot water supplied from the hot-water storage unit to the beverage supply route through the mixing container as a rinse hot water.

2. The beverage supply device according to claim 1, wherein the washing unit is configured to mix an undiluted alkaline wash fluid with the wash hot water to generate an alkaline wash fluid, the undiluted alkaline wash fluid being supplied from the undiluted wash fluid accommodating unit, supply the alkaline wash fluid to the beverage supply route communicating with the washing unit, supply the rinse hot water to the beverage supply route, mix an undiluted acid wash fluid with the wash hot water to generate an acid wash fluid, the undiluted acid wash fluid being supplied from the undiluted wash fluid accommodating unit, supply the acid wash fluid to the beverage supply route, and supply the rinse hot water to the beverage supply route.

3. The beverage supply device according to claim 1, wherein the washing unit is configured to intermittently supply the wash fluid to the beverage supply route.

4. The beverage supply device according to claim 2 wherein the washing unit is configured to intermittently supply the wash fluid to the beverage supply route.

5. The beverage supply device according to claim 1, wherein the bottom of the mixing container has a conical shape having a cross-sectional area gradually becoming smaller from the cylindrical side portion toward a lower end of the bottom with a center as a lowermost portion having the discharge opening, and the undiluted wash fluid accommodating unit is connected to a side portion of the bottom to supply the undiluted wash fluid to the mixing container.

6. The beverage supply device according to claim 5, further comprising:

a steam tank for heating the steam hot water supplied from the hot water storage unit to generate pressurized steam, a first steam supply pipe connected to the steam tank to supply the pressurized steam for forming the beverage, and a second steam supply pipe connecting the steam tank and the beverage supply route to supply the pressurized steam to the beverage supply route so that when the wash fluid or the rinse hot water is discharged from the mixing container to the beverage supply route, the pressurized steam is supplied to the second steam supply pipe to blow the wash fluid or the rinse hot water through the beverage supply route.

* * * * *